(12) United States Patent
Bertuzzi et al.

(10) Patent No.: US 7,827,769 B2
(45) Date of Patent: Nov. 9, 2010

(54) METHOD OF FOLDING A SHEET OF PACKING MATERIAL WITH AN EXTRACTION OPENING ABOUT A GROUP OF CIGARETTES, AND CORRESPONDING PACKAGE OF CIGARETTES

(75) Inventors: Ivanoe Bertuzzi, Casalecchio Di Reno (IT); Roberto Polloni, Modigliana (IT); Michele Squarzoni, Ferrara (IT); Fausto Negrini, Castelfranco Emilia (IT); Stefano Negrini, Calderara Di Reno (IT)

(73) Assignee: G.D Societa' per Azioni, Bologna (IT)

( * ) Notice: Subject to any disclaimer, the term of this patent is extended or adjusted under 35 U.S.C. 154(b) by 260 days.

(21) Appl. No.: 12/128,412

(22) Filed: May 28, 2008

(65) Prior Publication Data

US 2009/0071101 A1 Mar. 19, 2009

(30) Foreign Application Priority Data

Jun. 1, 2007 (IT) .......................... BO2007A0393

(51) Int. Cl.
*B65B 11/00* (2006.01)

(52) U.S. Cl. ............................ 53/466; 53/228; 53/461; 206/271

(58) Field of Classification Search .................... 53/228, 53/229, 230, 231, 232, 461, 466; 206/271
See application file for complete search history.

(56) References Cited

U.S. PATENT DOCUMENTS

| 1,458,977 | A | * | 6/1923 | De Escobales | ........... 229/87.13 |
| 2,196,910 | A | * | 4/1940 | Delamere | ..................... 53/223 |
| 2,620,964 | A | * | 12/1952 | Rose et al. | ............... 229/87.18 |
| 4,300,676 | A | * | 11/1981 | Focke et al. | .................. 206/264 |
| 4,909,019 | A | * | 3/1990 | Delacretaz et al. | ............ 53/463 |
| 4,916,884 | A | * | 4/1990 | Focke et al. | ..................... 53/462 |
| 5,018,625 | A | * | 5/1991 | Focke et al. | .............. 229/87.05 |
| 5,121,879 | A | * | 6/1992 | Focke et al. | .................. 229/203 |
| 5,701,725 | A | * | 12/1997 | Neri et al. | ...................... 53/466 |

(Continued)

*Primary Examiner*—Thanh K Truong
(74) *Attorney, Agent, or Firm*—Marshall, Gerstein & Borun LLP

(57) ABSTRACT

A method of folding a sheet of packing material, having an extraction opening, about a group of cigarettes; the method includes the steps of: bringing a first end wall of the group of cigarettes into contact with the flat sheet of packing material, so that the major transverse edges of the group of cigarettes are parallel to the short sides of the sheet of packing material, and the minor transverse edges of the group of cigarettes are parallel to the long sides of the sheet of packing material; folding the sheet of packing material into a U about the major transverse edges of the first end wall, so that the sheet of packing material covers both the major lateral walls of the group of cigarettes completely; folding the sheet of packing material onto a second end wall of the group of cigarettes; and folding the sheet of packing material onto the minor lateral walls of the group of cigarettes; the first end wall of the group of cigarettes is positioned asymmetrically with respect to the sheet of packing material, so that the first end wall of the group of cigarettes is closer to the short side of the sheet of packing material opposite the extraction opening, and is further from the short side of the sheet of packing material located close to the extraction opening.

6 Claims, 7 Drawing Sheets

U.S. PATENT DOCUMENTS

| | | | |
|---|---|---|---|
| 5,996,318 A * | 12/1999 | Draghetti | 53/466 |
| 6,505,735 B1 * | 1/2003 | Parker | 206/268 |
| 6,606,840 B2 * | 8/2003 | Focke et al. | 53/461 |
| 6,854,243 B2 * | 2/2005 | Sendo et al. | 53/234 |
| 6,935,091 B2 * | 8/2005 | Gamberini | 53/466 |
| 7,131,246 B2 * | 11/2006 | Dall'Omo et al. | 53/376.7 |
| 7,360,347 B2 * | 4/2008 | Lanzarini et al. | 53/463 |
| 2002/0189207 A1 * | 12/2002 | Spatafora et al. | 53/466 |
| 2003/0051444 A1 * | 3/2003 | Martelli | 53/466 |

\* cited by examiner

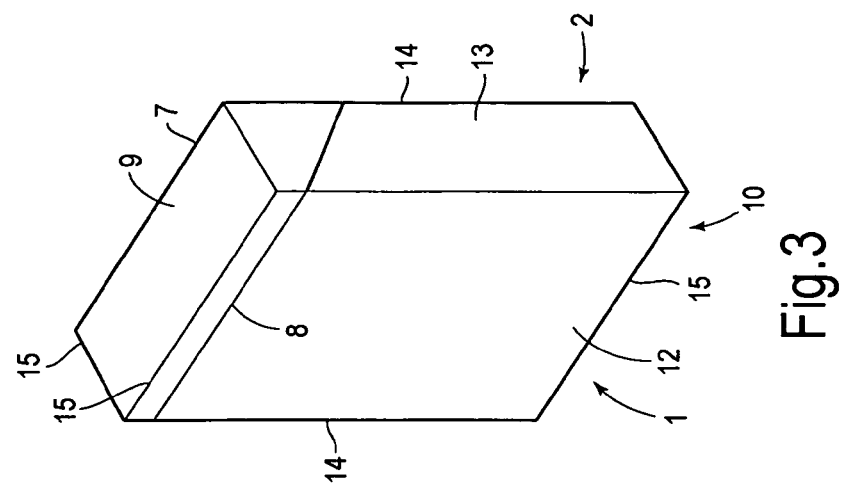
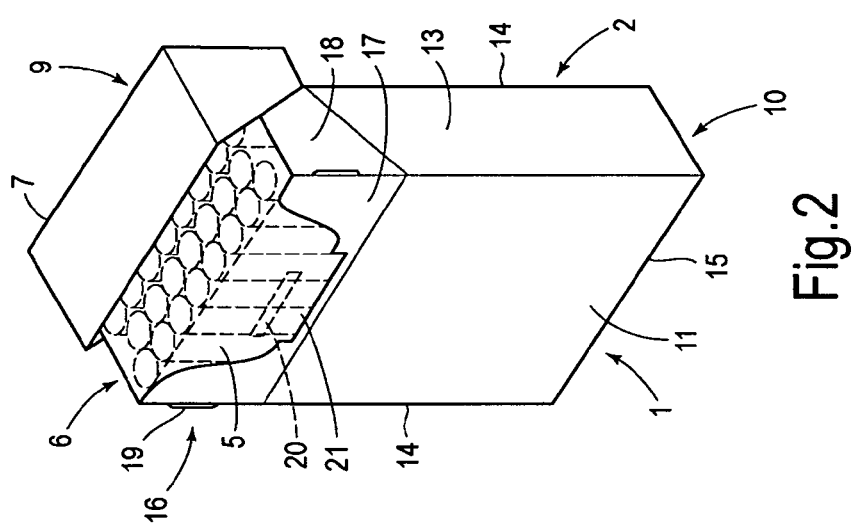
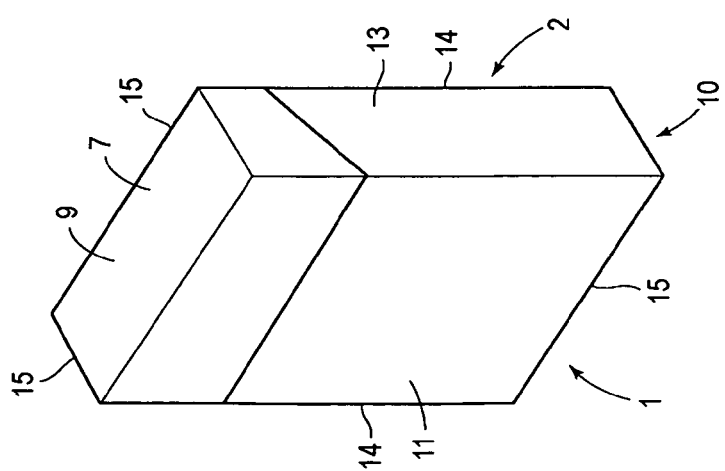

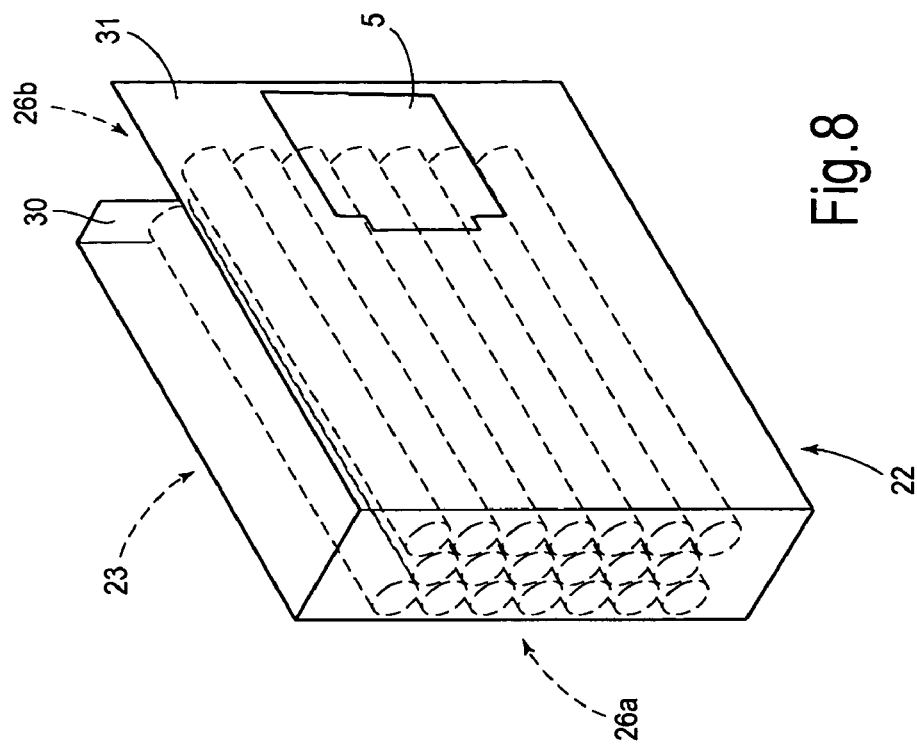
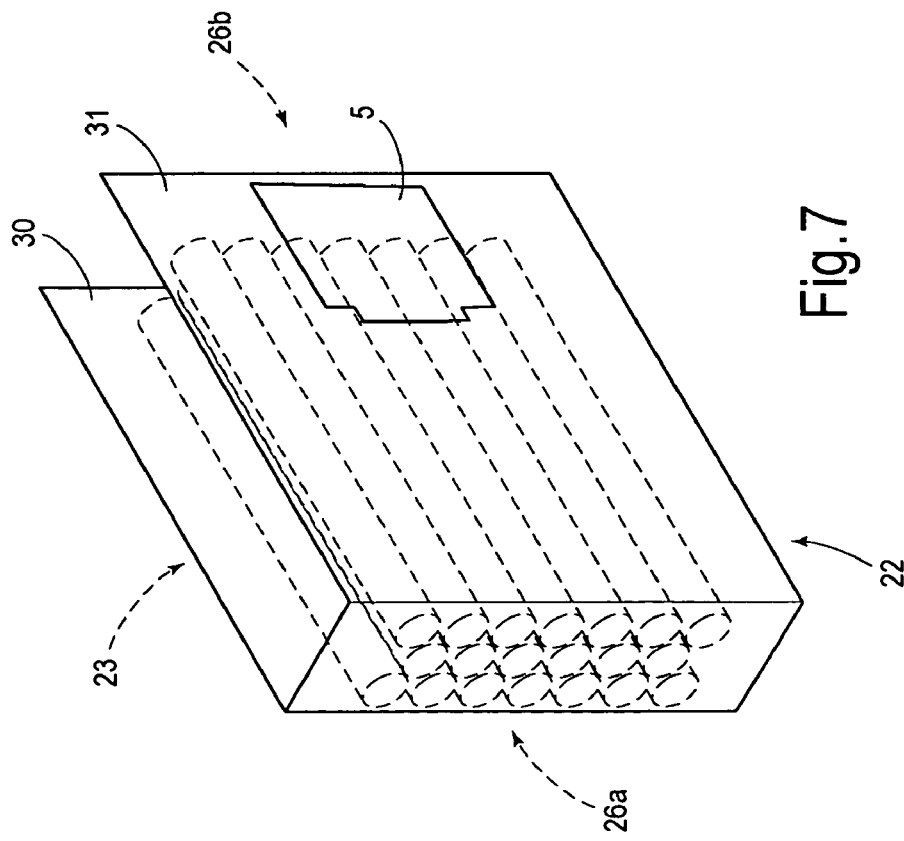

METHOD OF FOLDING A SHEET OF PACKING MATERIAL WITH AN EXTRACTION OPENING ABOUT A GROUP OF CIGARETTES, AND CORRESPONDING PACKAGE OF CIGARETTES

CROSS REFERENCE TO RELATED APPLICATIONS

This application claims the benefit of Italian patent application No. BO 2007 A 000393, filed Jun. 1, 2007.

TECHNICAL FIELD

The present invention relates to a method of folding a sheet of packing material with an extraction opening about a group of cigarettes, and to the corresponding package of cigarettes formed using such a method.

BACKGROUND ART

In a packet of cigarettes, the group of cigarettes is wrapped in a sheet of inner packing material. It has been observed that folding the sheet of inner packing material about the group of cigarettes may damage the tips of the cigarettes (i.e. the plain ends opposite the filter, where the tobacco is exposed), thus resulting in localized deformation and/or tobacco spill (i.e. tobacco fallout from the tips). This applies in particular to the corner cigarettes in the group, though damage is also evident in all the outermost cigarettes, i.e. located along the fold lines of the sheet of inner packing material.

Moreover, a heat-seal sheet of airtight inner packing material has also been proposed, which has a cigarette extraction opening closed by a reusable cover flap (i.e. with non-setting, re-stick adhesive). In which case, seeing as it has the cigarette extraction opening at the filters, the sheet of inner packing material is end-sealed at the tips of the cigarettes. As a result, not only when folding the sheet of inner packing material about the group of cigarettes, but also when heat sealing the end of the sheet, the tips of the cigarettes undergo mechanical stress possibly resulting in localized deformation and/or tobacco fallout, and thermal stress possibly resulting in local deterioration of the tobacco.

DISCLOSURE OF THE INVENTION

It is an object of the present invention to provide a method of folding a sheet of packing material with an extraction opening about a group of cigarettes, and a corresponding package of cigarettes, which method and package of cigarettes are designed to eliminate the aforementioned drawbacks, while at the same time being cheap and easy to implement.

According to the present invention, there are provided a method of folding a sheet of packing material with an extraction opening about a group of cigarettes, and a corresponding package of cigarettes, as claimed in the attached claims.

BRIEF DESCRIPTION OF THE DRAWINGS

A number of non-limiting embodiments of the present invention will be described by way of example with reference to the accompanying drawings, in which:

FIG. 1 shows a front view in perspective of a packet of cigarettes in accordance with the present invention and in a closed configuration;

FIG. 2 shows a front view in perspective of the FIG. 1 packet of cigarettes in an open configuration;

FIG. 3 shows a rear view in perspective of the FIG. 1 packet of cigarettes in a closed configuration;

FIGS. 6-10 show, schematically, the way in which the FIG. 5 sheet of inner packing material is folded about a group of cigarettes to form the FIG. 4 inner package;

PREFERRED EMBODIMENTS OF THE INVENTION

Figure 4:
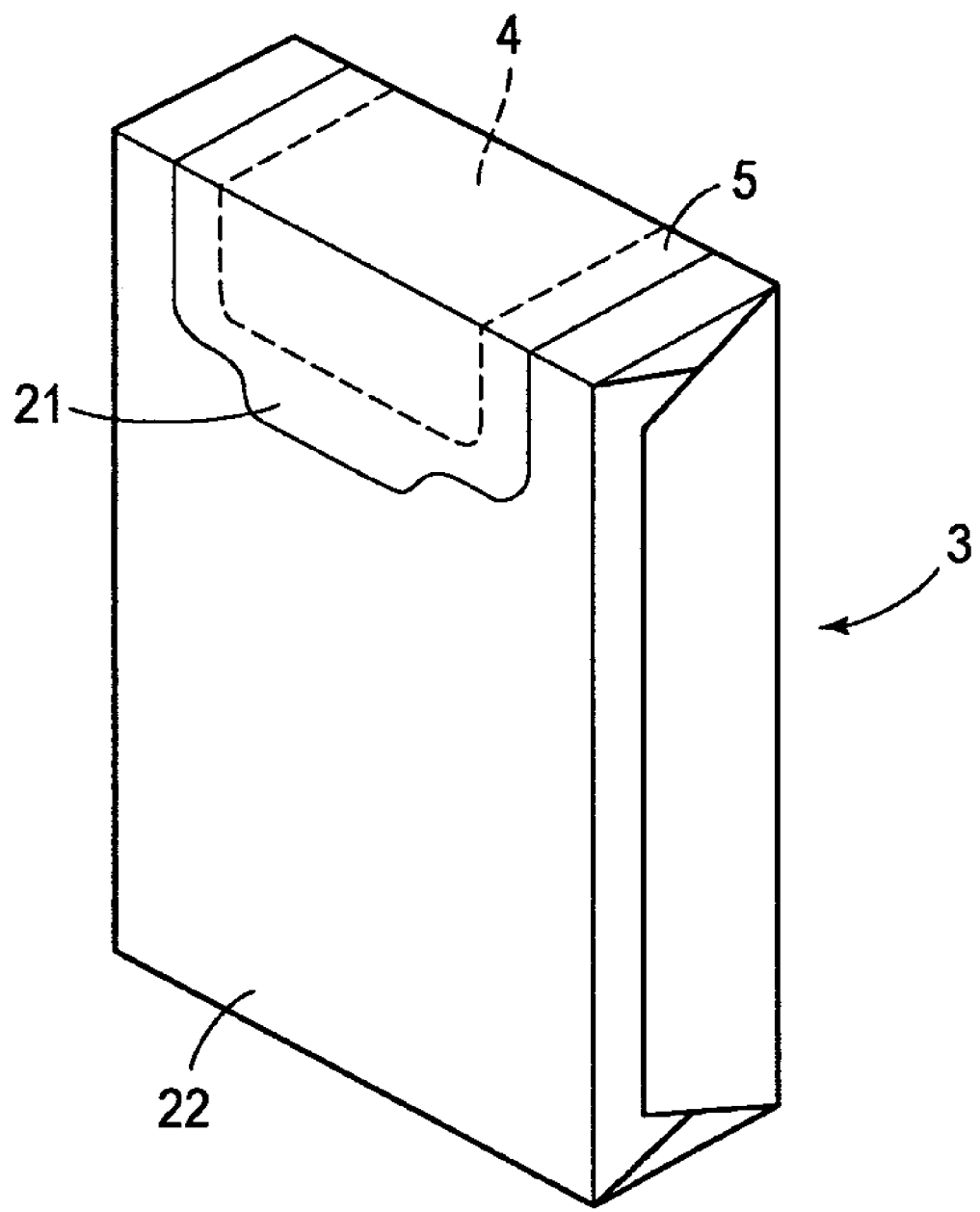
FIG. 4 shows a front view in perspective of an inner package of the FIG. 1 packet.

Number 1 in FIGS. 1, 2 and 3 indicates as a whole a rigid packet of cigarettes comprising a cup-shaped outer container 2 made of rigid cardboard; and an inner package 3 housed inside container 2. Inner package 3 houses a parallelepiped-shaped group of cigarettes, and has, at the top and front, a cigarette extraction opening 4 closed by a reusable cover flap 5, i.e. extraction opening 4 and cover flap 5 extend over a portion of a front wall of inner package 3, and a portion of a top wall of inner package 3.

Outer container 2 has an open top end 6, and a cup-shaped lid 7 hinged to container 2 along a hinge 8 to rotate, with respect to container 2, between an open position (FIG. 2) and a closed position (FIGS. 1 and 3) opening and closing open top end 6 respectively.

When lid 7 is in the closed position, outer container 2 is in the formula of a rectangular parallelepiped comprising a top wall 9 and a bottom wall 10 opposite and parallel to each other; two opposite parallel major lateral walls 11 and 12; and two opposite parallel minor lateral walls 13. More specifically, one major lateral wall 11 defines a front wall 11 of outer container 2, and the other major lateral wall 12 defines a rear wall 12 of outer container 2. Four longitudinal edges 14 are defined between lateral walls 13 and front and rear walls 11, 12; and eight transverse edges 15 are defined between top and bottom walls 9, 10 and front, rear, and lateral walls 11, 12, 13.

Packet 1 also comprises a collar 16, which is folded into a U and fixed (normally glued) inside outer container 2, so as to project partly outwards of open top end 6 and engage a corresponding inner surface of lid 7 when lid 7 is in the closed position. Collar 16 is made of rigid cardboard, and comprises a front wall 17 contacting front wall 11 of outer container 2; and two lateral walls 18 located on opposite sides of front wall 17 and contacting minor lateral walls 13 of outer container 2.

In a preferred embodiment, collar 16 has two lateral projections 19, which engage the lateral walls of lid 7 interferentially to hold lid 7 in the closed position.

In a preferred embodiment, cover flap 5 is fixed to inner package 3 using non-setting, re-stick adhesive 20 (shown schematically in FIG. 2), which is applied to the underside surface of cover flap 5 and extends about the whole of extraction opening 4, so cover flap 5 can be repeatedly detached partly from inner package 3 (i.e. each time packet 1 of cigarettes is opened) and then fixed back onto inner package 3. Cover flap 5 preferably has a bottom grip tab 21, by which to grip and lift up cover flap 5, and which has no re-stick adhesive and rests on front wall 17 of collar 16. In other words, to lift up cover flap 5, the user simply grips grip tab 21, which is in no way fixed to front wall 17 of collar 16.

Figure 5:
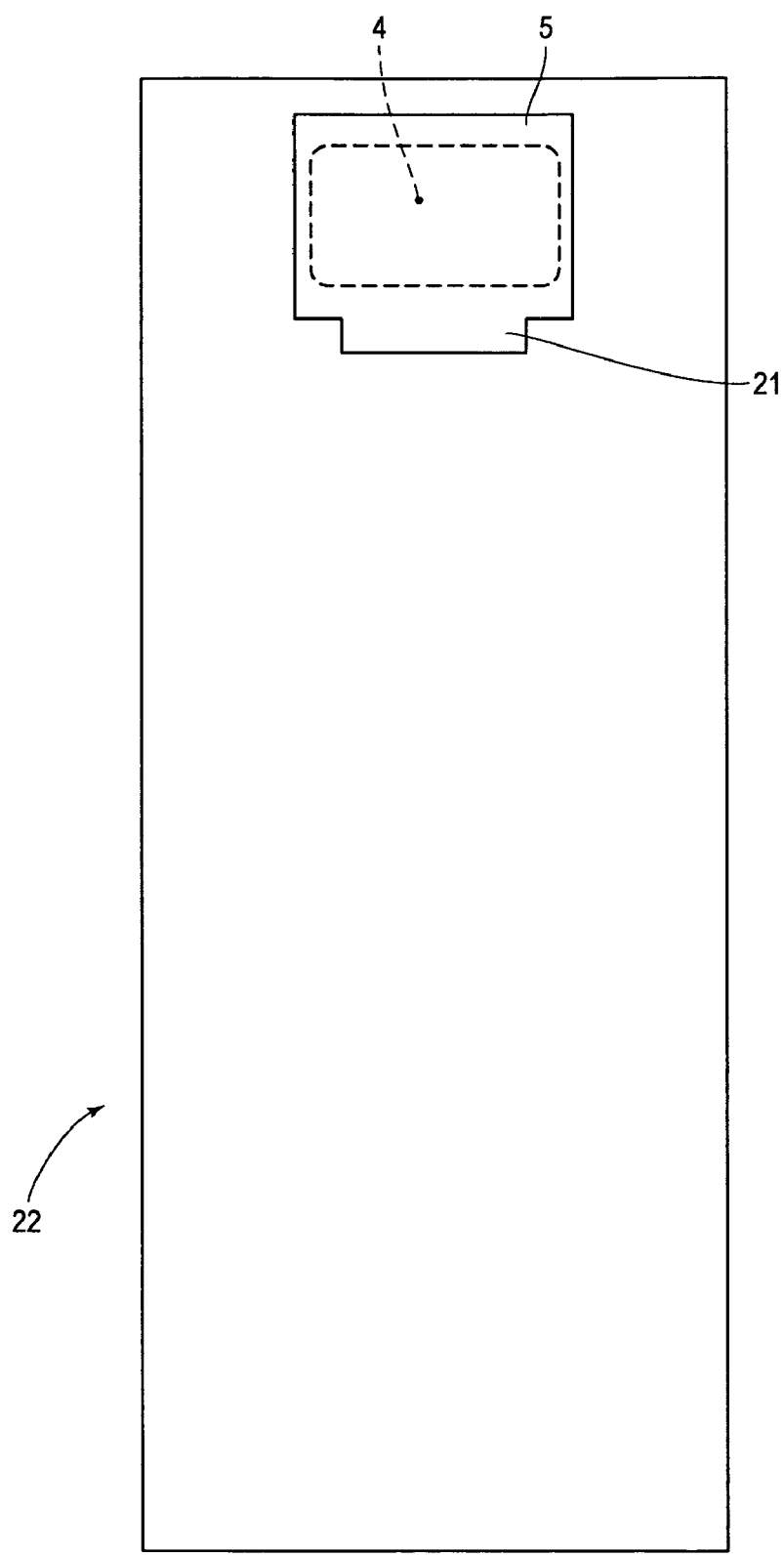
FIG. 5 shows a plan view of a sheet of inner packing material, which is wrapped about a group of cigarettes to form the FIG. 4 inner package.

As shown in FIG. 5, inner package 3 is formed by folding a rectangular sheet 22 of packing material made of stratified airtight plastic material with an outer coating of heat-seal varnish. Once sheet 22 of packing material is folded about the group of cigarettes to form inner package 3, the form of inner package 3 is preferably stabilized by heat sealing the superimposed portions of sheet 22 of packing material.

Before being folded about the group of cigarettes, sheet 22 of packing material is cut to define extraction opening 4; and cover flap 5, gummed on the underside, is then applied to sheet 22 of packing material. That is, the underside surface of the cover flap is coated with re-stick adhesive which, inside extraction opening 4, glues the inner portion of sheet 22 of packing material permanently to cover flap 5, and, outside extraction opening 4, glues sheet 22 of packing material detachably to cover flap 5.

As shown in FIG. 5, sheet 22 of packing material is in the form of an elongated rectangle, and has two opposite parallel long sides, and two opposite parallel short sides; and extraction opening 4, closed by reusable cover flap 5, is located close to a short side of sheet 22 of packing material. In a preferred embodiment, the top edge of cover flap 5 is located 3 to 10 mm (typically 5 mm) from the edge of sheet 22 of packing material, and extraction opening 4 is located 8 to 15 mm (typically 10 mm) from the edge of sheet 22 of packing material (i.e. 5 mm from the edge of cover flap 5).

Figure 6:
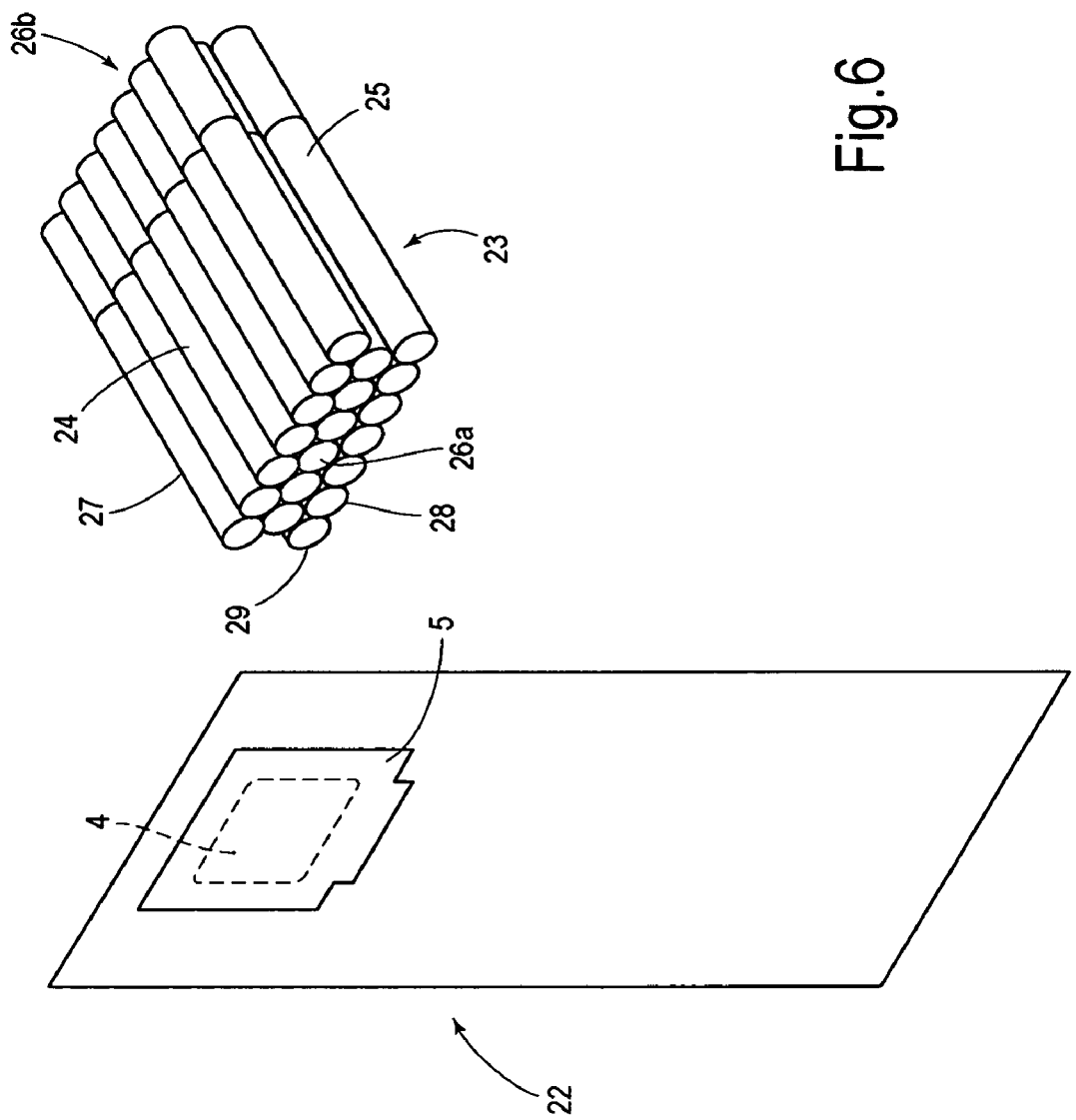
Figure 10:
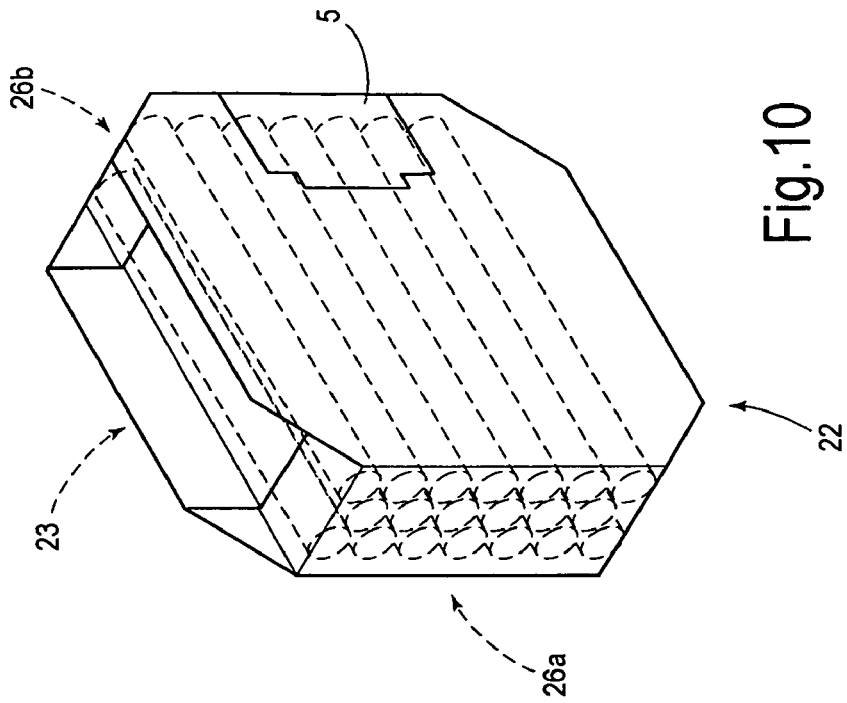

As shown in FIG. 6, a group 23 of cigarettes is substantially in the form of a rectangular-section parallelepiped, and comprises two opposite, parallel, rectangular major lateral walls 24 (only one shown in FIG. 6) defined by cylindrical lateral walls of the cigarettes; two opposite, parallel, rectangular minor lateral walls 25 (only one shown in FIG. 6) defined by cylindrical lateral walls of the cigarettes and smaller than major lateral walls 24; and two opposite, parallel, rectangular end walls 26 (only one shown in FIG. 6) defined by flat ends of the cigarettes. It is important to note that one end wall 26a of group 23 of cigarettes is defined by the tips of the cigarettes (i.e. the ends of the cigarettes opposite the filter, where the tobacco is exposed), and the other end wall 26b of group 23 of cigarettes is defined by the cigarette filters.

Four longitudinal edges 27 (only three shown in FIG. 6) are defined between the two major lateral walls 24 and the two minor lateral walls 25; four major transverse edges 28 (only three shown in FIG. 6) are defined between the two major lateral walls 24 and the two end walls 26; and four minor transverse edges 29 (only three shown in FIG. 6) are defined between the two minor lateral walls 25 and the two end walls 26.

FIGS. 6-10 show the way in which sheet 22 of packing material is folded about group 23 of cigarettes to form inner package 3.

Firstly, as shown in FIG. 6, end wall 26a of group 23 of cigarettes is brought into contact with the flat sheet 22 of packing material, so that major transverse edges 28 of group 23 of cigarettes are parallel to the short sides of sheet 22 of packing material, and minor transverse edges 29 of group 23 of cigarettes are parallel to the long sides of sheet 22 of packing material.

End wall 26a of group 23 of cigarettes is positioned symmetrically in the centre of sheet 22 of packing material with respect to the long sides of sheet 22 of packing material, and asymmetrically with respect to the short sides of sheet 22 of packing material. More specifically, end wall 26a of group 23 of cigarettes is located asymmetrically with respect to sheet 22 of packing material, so that end wall 26a of group 23 of cigarettes is closer to the short side of sheet 22 of packing material opposite extraction opening 4, and is further from the short side of sheet 22 of packing material close to extraction opening 4.

As shown in FIG. 7, sheet 22 of packing material is then folded into a U about major transverse edges 28 of end wall 26a to completely cover both major lateral walls 24, and so that the U-folded sheet 22 of packing material has two portions 30, 31 projecting from end wall 26b of group 23 of cigarettes. Portion 30 is smaller than portion 31 and located opposite extraction opening 4; whereas portion 31 is larger than portion 30 and contains part of extraction opening 4.

Figure 9:
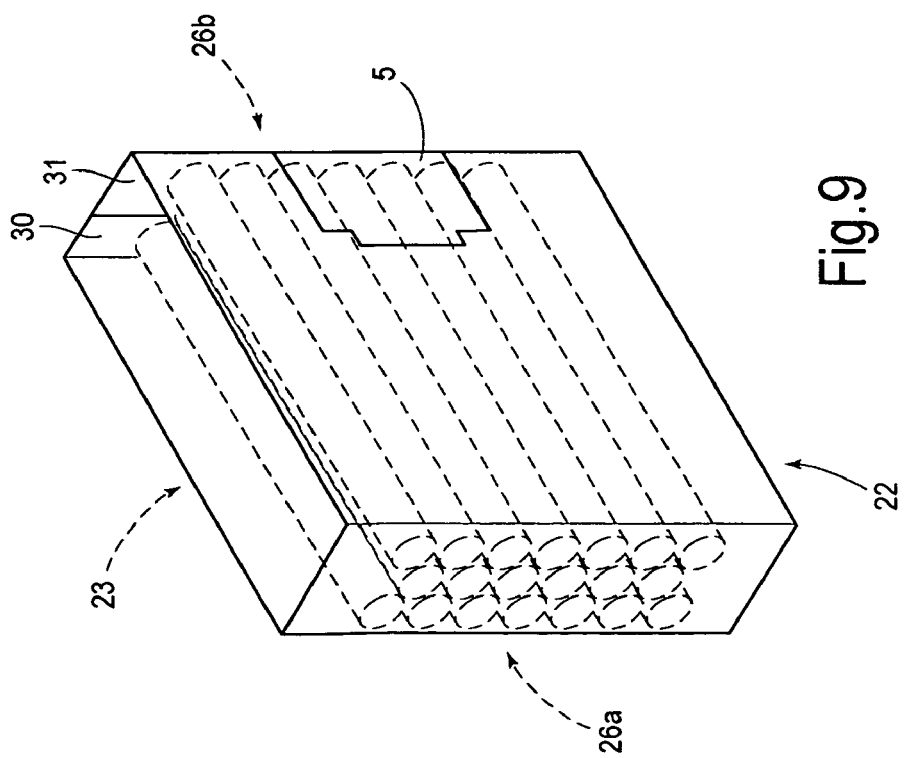

At this point, portion 30 is folded about one major transverse edge 28 onto end wall 26b, as shown in FIG. 8, and portion 31 is folded about the other major transverse edge 28 onto end wall 26b and so as to overlap portion 30, as shown in FIG. 9.

Finally, to complete the folding of sheet 22 of packing material about group 23 of cigarettes, sheet 22 of packing material is folded onto minor lateral walls 25 of group 23 of cigarettes by folding sheet 22 of packing material about minor transverse edges 29 onto minor lateral walls 25 (FIG. 10), and then folding sheet 22 of packing material about longitudinal edges 27 onto minor lateral walls 25.

In the preferred embodiment shown in the drawings, end wall 26a of group 23 of cigarettes is positioned with respect to sheet 22 of packing material so that portion 31 is the same size as end wall 26b, and the top edge of portion 31 is superimposed on a major transverse edge 28 of end wall 26b (i.e. the outer surface of inner package 3 at end wall 26b is formed entirely by portion 31). Moreover, end wall 26a of group 23 of cigarettes is positioned with respect to sheet 22 of packing material so that portion 30 is so sized as not to be overlapped by the part of extraction opening 4 formed in portion 31, and is therefore not visible through extraction opening 4 when cover flap 5 is raised.

The form of inner package 3 is preferably (though not necessarily) stabilized by connecting the superimposed portions on end wall 26b and/or on minor lateral walls 25, and may be stabilized by heat-sealing or, more rarely, gluing.

In the FIGS. 1-10 embodiment, cover flap 5 of extraction opening 4 is positioned with grip tab 21 on the front wall of inner package 3, and is therefore opened upwards (i.e. from the front wall to the top wall of inner package 3), and a top portion of cover flap 5 remains in contact with the top wall of inner package 3. In which case, grip tab 21 is located on the opposite side of cover flap 5 to the short side of sheet 22 of packing material located close to extraction opening 4.

Figure 11:
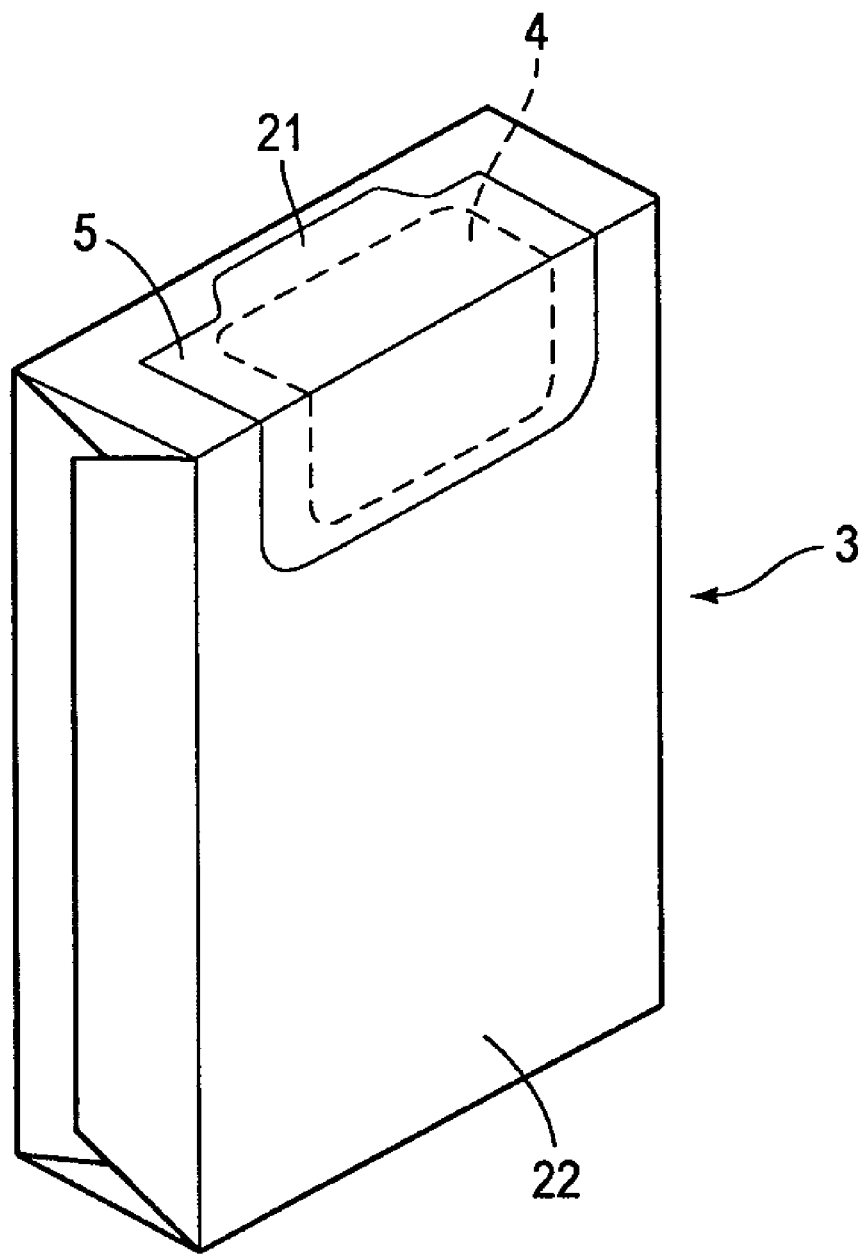
FIG. 11 shows a front view in perspective of a variation of the FIG. 4 inner package.

In the FIG. 11 variation, cover flap 5 of extraction opening 4 is positioned with grip tab 21 on the top wall of inner package 3, and is therefore opened downwards (i.e. from the top wall to the front wall of inner package 3), and a bottom portion of cover flap 5 remains in contact with the front wall of inner package 3. In which case, grip tab 21 is located on the same side of cover flap 5 as the short side of sheet 22 of packing material located close to extraction opening 4. For easy grip, part or all of grip tab 21 may project from the top wall towards the rear wall of inner package 3; in which case, grip tab 21 projects at least partly from the short side of sheet 22 of packing material located close to extraction opening 4.

When forming inner package 3 as described above, sheet 22 of packing material is heat sealed at end wall 26b, defined by the cigarette filters, of group 23 of cigarettes, as opposed to end wall 26a defined by the tips of the cigarettes, which are therefore spared the combined pressure and heat involved in the heat-seal operation, and are therefore safeguarded against mechanical deformation caused by application of pressure, and thermal alteration caused by application of heat. As regards thermal alteration of the tobacco, it is important to note that tobacco is a perishable organic substance, and is treated to achieve a given moisture, and impregnated with a given amount of volatile substances. So the moisture and/or volatile substances with which the tobacco is impregnated may obviously be affected at least locally by the application of heat.

The invention claimed is:

1. A method of folding a sheet of packing material about a group of cigarettes;

the sheet (22) of packing material is in the form of an elongated rectangle, has two opposite parallel long sides and two opposite parallel short sides, and comprises an extraction opening (4) closed by a reusable cover flap (5) and located close to a short side;

the group (23) of cigarettes is substantially parallelepiped-shaped, and comprises two major lateral walls (24), two minor lateral walls (25), and two end walls (26); four longitudinal edges (27) are defined between the two major lateral walls (24) and the two minor lateral walls (25); four major transverse edges (28) are defined between the two major lateral walls (24) and the two end walls (26); and four minor transverse edges (29) are defined between the two minor lateral walls (25) and the two end walls (26);

the method comprises the steps of:

bringing a first end wall (26a) of the group (23) of cigarettes into contact with the flat sheet (22) of packing material, so that the major transverse edges (28) of the group (23) of cigarettes are parallel to the short sides of the sheet (22) of packing material, and the minor transverse edges (29) of the group (23) of cigarettes are parallel to the long sides of the sheet (22) of packing material;

folding the sheet (22) of packing material into a U about the major transverse edges (28) of the first end wall (26a), so that the sheet (22) of packing material (22) covers both the major lateral walls (24) completely;

folding the sheet (22) of packing material onto a second end wall (26b) of the group (23) of cigarettes; and folding the sheet (22) of packing material onto the minor lateral walls (25) of the group (23) of cigarettes;

and the method is characterized by comprising the further step of positioning the first end wall (26a) of the group (23) of cigarettes asymmetrically with respect to the sheet (22) of packing material, so that the first end wall (26a) of the group (23) of cigarettes is closer to the short side of the sheet (22) of packing material opposite the extraction opening (4), and is further from the short side of the sheet (22) of packing material located close to the extraction opening (4).

2. A method as claimed in claim 1, wherein the U-folded sheet (22) of packing material has a first and second portion (30, 31) projecting from the second end wall (26b) of the group (23) of cigarettes; the first portion (30) is smaller than the second portion (31) and located opposite the extraction opening (4); the second portion (31) is larger than the first portion (30) and contains part of the extraction opening (4); and the method comprises the further steps of:

folding the first portion (30) about one major transverse edge (28) onto the second end wall (26b); and folding the second portion (31) about the other major transverse edge (28) onto the second end wall (26b) and so as to overlap the first portion (30).

3. A method as claimed in claim 2, wherein the first end wall (26a) of the group (23) of cigarettes is positioned with respect to the sheet (22) of packing material so that the second portion (31) is the same size as the second end wall (26b), and a top edge of the second portion (31) is therefore superimposed on a major transverse edge (28) of the second end wall (26b).

4. A method as claimed in claim 2, wherein the first end wall (26a) of the group (23) of cigarettes is positioned with respect to the sheet (22) of packing material so that the first portion (30) is so sized as not to be overlapped by the part of the extraction opening (4) formed in the second portion (31).

5. A method as claimed in claim 2, wherein the step of folding the sheet (22) of packing material onto the minor lateral walls (25) of the group (23) of cigarettes comprises the further steps of:

folding the sheet (22) of packing material about the minor transverse edges (29) onto the minor lateral walls (25); and then folding the sheet (22) of packing material about the longitudinal edges (27) onto the minor lateral walls (25).

6. A method as claimed in claim 1, and comprising the further step of stabilizing the sheet (22) of packing material folded about the group (23) of cigarettes by connecting the superimposed portions on the second end wall (26b) and on the minor lateral walls (25).

* * * * *